United States Patent [19]

Dana et al.

[11] Patent Number: 5,032,455
[45] Date of Patent: Jul. 16, 1991

[54] SILYATED ADDITION POLYMERS WITH PENDANT IONIC MOIETIES

[75] Inventors: David E. Dana, Pittsburgh; Ernest L. Lawton, Allison Park, both of Pa.; George L. Brodmann, Charlottesville, Va.

[73] Assignee: PPG Industries, Inc., Pittsburgh, Pa.

[21] Appl. No.: 586,917

[22] Filed: Sep. 24, 1990

Related U.S. Application Data

[62] Division of Ser. No. 292,859, Jan. 3, 1989, Pat. No. 4,983,699.

[51] Int. Cl.$^5$ .............................................. B32B 27/00
[52] U.S. Cl. .................................. 428/394; 428/429; 428/441
[58] Field of Search ..................... 428/394, 441, 429

[56] References Cited

U.S. PATENT DOCUMENTS

| | | | |
|---|---|---|---|
| 2,721,812 | 10/1955 | Iler | 117/76 |
| 3,197,333 | 7/1965 | Schonfeldt et al. | 117/139.5 |
| 3,252,825 | 5/1966 | Marzocchi et al. | 117/126 |
| 3,467,634 | 9/1969 | Jacknow et al. | 260/80.71 |
| 3,544,501 | 12/1970 | Fearnley et al. | 260/29.6 |
| 3,678,098 | 7/1972 | Lewis et al. | 260/89.5 N |
| 3,694,393 | 9/1972 | Lewis et al. | 260/29.6 |
| 3,706,697 | 12/1972 | Backderf | 260/29.2 M |
| 4,035,540 | 7/1977 | Gander | 428/198 |
| 4,043,953 | 8/1977 | Chang et al. | 260/18 S |
| 4,611,039 | 9/1986 | Powell et al. | 526/279 |
| 4,708,947 | 11/1987 | Maruyama et al. | 503/209 |
| 4,748,224 | 5/1988 | Novicky | 526/279 |

FOREIGN PATENT DOCUMENTS

| | | | |
|---|---|---|---|
| 0094898 | 11/1983 | European Pat. Off. | 526/240 |
| 60-202109 | 10/1985 | Japan | 526/240 |
| 63-139957 | 6/1988 | Japan | 526/279 |
| 64-16812 | 1/1989 | Japan | 526/240 |
| 1055897 | 1/1967 | United Kingdom | 526/240 |
| 1271500 | 4/1972 | United Kingdom . | |

OTHER PUBLICATIONS

"Petrochemicals Department Intermediates Division Sodium Styrene Sulfonate" from DuPont de Nemours Company.
Material Data Safety Sheet from Lubrizol Corp. on Sodium-2-Arylamido-2-Methylpropane Sulfonic Acid Salt.
Technical Brochure Entitled "Sipomer Q-6-75," Alcolac Technical Data Bulletin.
Chemical Abstract No. 105: 192480n Entitled "Water-Soluble Polymers Bearing Quaternary Ammonium and Alkyloxysilyl Groups," Issue 24, 1986, p. 16.
Chemical Abstract No. 101: 73721z Entitled "Binders for Glass Fiber Strands", Issue 18, 1984, p. 12.

*Primary Examiner*—Joseph L. Schofer
*Assistant Examiner*—N. Sarofim
*Attorney, Agent, or Firm*—Kenneth J. Stachel

[57] ABSTRACT

Addition interpolymers with pendant ionic moieties and pendant reactable silane moieties are prepared by addition polymerization of ethylenically unsaturated monomers having ionic moieties with organofunctional silane compounds having ethylenic unsaturation in the organofunctional moiety of the silane where the silane also has reactable alkoxy and/or hydroxy group. The addition polymerization is performed in the presence of a free radical initiator at an elevated temperature up to around 90° C. and in a nonoxidizing atmosphere. The amount of the ionic monomer is effective to result in the interpolymer having at least water dispersibility and most suitably water emulsifiability and the amount of the silane monomer is in the range of about 1 to about 15 weight percent of the interpolymer. The interpolymer may be prepared with one or more additional ethylenically unsaturated monomers where the amount does not decrease the ionic character of the interpolymer below that which renders the interpolymer water emulsifiable.

24 Claims, No Drawings

SILYATED ADDITION POLYMERS WITH PENDANT IONIC MOIETIES

This is a division of application Ser. No. 07/292,859, filed Jan. 3, 1989 now U.S. Pat. No. 4,983,699.

The present invention is directed to addition polymeric materials having pendant reactable silylation and having at least one pendant ionic moiety or group.

BACKGROUND OF THE INVENTION

Vinyl polymers with ionic groups such as sulphonates or quaternary ammonium salts have found applications in various fields. Since these polymeric materials are water soluble, their utilization as films or coatings on inorganic oxide surfaces and substrates results in a less tenacious film or coating that is not water fast. A moist environment is anathema to such films and coatings on inorganic oxide surfaces because of their ease of removal under such conditions. What is desired in the art is a more tenacious film or coating of a polymeric material with ionic functional moieties so that better adhesive affinity spawns new uses for these polymeric materials on inorganic oxide surfaces.

It is an object of the present invention to provide polymeric materials having at least one ionic moiety and also having good affiliation with inorganic oxide surfaces.

SUMMARY OF THE INVENTION

The aforementioned object and other objects gleaned from the following disclosure are accomplished by the present invention. The invention comprises polymeric reaction product of at least one ethylenically unsaturated monomer having an ionic moiety (ionic-containing monomer) and a copolymerizable organo-functional, alkoxy/hydroxy, silane compound. The silane compound has ethylenic unsaturation for copolymerization in its organofunctional moiety and has from around 1 to 3 alkoxy and/or hydroxy groups associated with the silane (silane compound). The amount of the ionic-containing monomer is effective to yield enough pendant ionic groups in the resulting polymer to provide for at least its emulsifiability in water. The amount of the silane compound is an effective amount to yield pendant hydrolyzable silane groups for the polymer in an amount of about 1 to about 15 weight percent of the polymer. The polymeric reaction product is produced from at least these two monomers or with the addition of one or more ethylenically unsaturated monomers by addition polymerization. This polymerization includes: the presence of a free radical initiation catalyst in an effective catalytic amount, the presence of a liquid carrier, a temperature of polymerization greater than room temperature, and a nonoxidizing atmosphere. When the ionic monomer and ethylenically unsaturated silane compound are the only monomers used in preparing the polymer, the ionic monomer is typically present in a predominant amount in the range of around 85 to 99 weight percent. When additional ethylenically unsaturated monomer is present in addition to the two previously mentioned monomers, the ionic monomer is present in the amount of around 10 to around 98 weight percent of polymer.

Inorganic and organic surfaces or substrates which have reactable hydroxyl functionality can be treated with the interaction polymer of the present invention with or without a carrier. Also, the interaction polymer can be cured to form a film on the surfaces or substrates by having a curing agent added to a formulation of the interaction polymer or by evaporating the carrier or by drying in contact with air or any art recognized method.

DETAILED DESCRIPTION OF THE INVENTION AND PREFERRED EMBODIMENT

The curable addition polymeric material of the present invention with pendant ionic moieties and pendant hydrolyzed or hydrolyzable silane moieties has one or more repeating units from an ethylenically unsaturated monomer having an ionic moiety and from ethylenically unsaturated monomer having alkoxy and/or hydroxy silane moiety. The ethylenically unsaturated monomer to which the ionic moiety is bonded can be any ethylenically unsaturated monomer having at least one

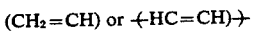

group. Nonexclusive examples of suitable ethylenically unsaturated monomers include:

a) substituted and unsubstituted acrylate and methacrylate compounds including: the alkyl acrylates such as methyl acrylate, ethyl acrylate, butyl acrylate, propyl acrylate, 2-ethylhexyl acrylate, and the like; the alkyl methacrylates such as methyl methacrylate, butyl methacrylate, 2-ethylhexyl methacrylate, lauryl methacrylate, and the like; and b) methyl alpha-chloracrylate; hydroxyethyl acrylate; dihydroperfluorobutyl acrylate; propylacrylate; isobornyl acrylate; cyclohexyl acrylate; dodecyl acrylate; hexyldecyl acrylate; isopropyl acrylate; tetradecyl acrylate; ethylene glycol; sec butyl acrylate; dimethacrylate; methacrylate; 2-n-tert-butylaminoethyl methacrylate; 2-butyl methacrylate; glycidyl methacrylate; 2 chloroethyl methacrylate; 3,3-dimethylbutyl methacrylate; 2 ethylhexyl methacrylate; 2 methoxyethyl methacrylate; pentyl methacrylate; methyl methacrylate; ethyl methacrylate; n-butyl methacrylate; isobutyl methacrylate; sodium methacrylate; isopropyl methacrylate; propyl methacrylate and the like; and c) unsaturated nitriles such as acrylonitrile, methacrylonitrile and ethacrylonitrile. Still other unsaturated monomers which can be used include vinyl aromatic hydrocarbons such as acrolein, styrene, alpha-methyl styrene. Typical substituted styrene compounds include: alpha methyl; styrene, vinyltoluene; modified styrene; 4-bromostyrene; 4-chloro-3-fluorostyrene; 2-chlorostyrene; 2,5-dichlorostyrene; 2,3-difluorostyrene; 2,4-dimethyl styrene; 4-ethoxystyrene; 4-ethylstyrene; 4-hexadecylstyrene; 3-hydroxymethylstyrene; 4-iodostyrene; 4-isopentoxystyrene; 4-nonadecylstyrene, and the like, and vinyltoluene, vinyl acetate, vinyl chloride and the like and epoxy functional monomers such as glycidyl methacrylate and the like.

Nonexclusive examples of the ionic moieties include: sulfonates, quaternary ammonium salts, and carboxylate groups, and these may have an association with the aforelisted ethylenically unsaturated monomers by any method known to those skilled in the art. For instance, the sulfonation of the monomer materials to produce sulfonates may occur by treatment of alpha-olefins with $SO_3$ or through the reaction of aromatic hydrocarbons with arylhalide sulfonates in the presence of thionyl chloride. Another method is the reaction of unsaturated hydrocarbons with metal sulfites or bisulfites to form metal sulfonates (sulfitation or bisulfitation) or from sulfonating 2-bromoethylbenzene followed by treatment with alkali to effect dehydrobromonation and formation of the sulfonite salt.

Nonexclusive examples of the quaternary ammonium salt moieties of the present invention are those having the formula:

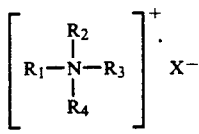

in which, broadly, $R_1$, $R_2$, $R_3$ and $R_4$ are organic groups, three of the four may be any monovalent organic radical, or two of them taken together may be a divalent organic group, or the compounds can be cyclic and the nitrogen atom can be included in a heterocyclic ring. The moiety $X^-$ may be chlorine, bromine, fluorine, alkoxy, nitro, aryloxy and carboxy groups and the like. Nonexclusive examples of the quaternary ammonium groups are: pyridinium, piperidinium, pyrrolidinium, and quinolinium ions. One of the valences $R_1$, $R_2$, $R_3$ or $R_4$ is an unsaturated group such as the following: alkyl acrylates, the alkyl group having one to eight carbon atoms, e.g., methyl acrylate, ethyl acrylate, etc., preferably ethyl acrylate, and ethenyl, propenyl, butenyl, pentenyl, hexenyl, heptenyl, octenyl, nonenyl, decenyl, hendecenyl, dodecenyl, tridecenyl, tetradecenyl, pentadecenyl, hexadecenyl, heptadecenyl, octadecenyl, nonadecenyl, and eicosenyl. While, as indicated, the nitrogen substituents can be any organic groups, for three of the four it is preferred that the nitrogen valences represented by $R_1$, $R_2$, $R_3$ and $R_4$, be satisfied by unsubstituted hydrocarbon groups of from 1 to 20 carbon atoms and/or polyoxyalkylenes like polyoxyethylenes and polyoxymethylene and mixture of any of these. The substituents can be the same or different, and if a divalent group is used, it will satisfy two of the valences. Nonexclusive examples of unsubstituted hydrocarbon radicals include such aliphatic groups as methyl, hendecyl, ethyl, dodecyl, propyl, tridecyl, butyl, tetradecyl, pentyl, pentadecyl, hexyl, hexadecyl, heptyl, heptadecyl, octyl, octadecyl, nonyl, nonadecyl, decyl, and eicosyl. It will be understood that the substituents or any of these can be cyclic and, for instance, they can be alicyclic. Thus, as an example a substituent of hexyl includes the cyclohexyl group. Similarly, the cycloalicyclic compounds can be unsaturated and they can be unsaturated in varying degrees. There can be used, for instance, the 1,3-cyclohexyldienyl group. In addition to the aliphatic and cycloaliphatic substituents of the character described, one can use aromatic types of substituents in one of the positions of $R_1$, $R_2$, $R_3$ and $R_4$. For instance, one can use phenyl; abietyl; naphthyl; fluoryl; and diphenyl.

While, as has been indicated, it is preferred to satisfy the valences $R_1$, $R_2$, $R_3$ and $R_4$ with unsubstituted hydrocarbon groups of from one to twenty carbon atoms and/or polyoxyalkylene, one can prepare compounds of the invention by using substituted hydrocarbon groups. It seems hardly necessary to list all of the possible substitutions since such compounds are generally well known as applied to quaternary ammonium salts and since the invention is here not directed primarily to the cation of the molecule.

In employing the above-described substituents one skilled in the art will not attempt to put too many long-chain substituents on the nitrogen atom because of the well-known phenomenon of stearic hindrance. Also, the carboxylate moiety can be derived from an ethylenically unsaturated monomer that is an acid monomer selected from the group consisting of acrylic acid, methacrylic acid, fumaric acid, maleic acid, maleic anhydride and itaconic acid. The preferred acid comonomer is acrylic acid. The carboxylic acid groups on the ethylenically unsaturated monomer can convert to ionic moieties through neutralization of the monomer or subsequent polymeric material.

The amounts of the ionic monomer present in the resulting polymeric material are sufficient to provide enough of the pendant ionic group to at least emulsify the polymer in water. Preferably the amount of the pendant ionic groups is sufficient to solubilize the polymer in water. Generally the amount of the ionic monomer present in the resulting polymeric material when only two monomers, the ionic monomer and the silane monomer, are present is in the range of about 85 to about 95 weight percent of the polymeric material.

The preferred ionic monomer is sodium styrene sulfonate for producing a sulfonate ionic moiety, and this material is available from E. I. duPont Demours & Company under the designation (SSS). The SSS is a reactive vinyl monomer with a strongly anionic sulfonate group in the form of a free flowing white powder with a 20.5 weight percent solubility in water at 25° C. having 89 weight percent of the SSS monomer as a minimum and an amount of water of 2.4 weight percent as maximum. Another example of a sulfonate ionic monomer is 2-acrylamido-2-methyl propanesulfonic acid available from Lubrizol Corporation, Wickliffe, Ohio 44092, under the trade designation AMPS in the form a gray/white crystalline solid having less than 1 percent volatiles. An example of a quaternary ammonium salt ionic monomer that can be used is the quaternized product of dimethylaminoethyl methacrylate and methyl chloride, which is available under the trade designation Sipomer Q-6-75 as a 75 percent active material in water from Alcolac, Inc., Baltimore, Md. 21226.

The other component of the addition polymeric material is the organo alkoxysilane compound. The preferred organoalkoxysilane compounds are the acrylatoalkylalkoxysilanes, such as gamma-acryloxypropyltrimethoxysilane, and the like and the methacrylatoalkylalkoxysilane such as gamma-methacryloxypropyltrimethoxysilane, gamma-methacryloxypropyltriethoxysilane, gamma-methacryloxypropyltris(2-ethoxyethoxy)silane and the like. Of these alkoxysilanes, gamma-methacryloxypropyltrimethoxysilane is especially preferred due to its greater reactivity. Vinyl organoalkoxysilanes such as vinyltrimethoxysilane, vinyltriethoxysilane and vinyl tris(2-methoxyethoxy)silane are less effective than the acrylatoalkylalkoxysilanes or methacrylatoalkylalkoxysilanes, but these may be used in some instances. The gamma-methacryloxypropyltrimethoxysilane is available from Union Carbide Corporation under the trade designation A-174 Silane. These organoalkoxy silane compounds can be used in unhydrolyzed, partially hydrolyzed, or fully hydrolyzed form. In the latter two forms, and particularly in the latter form, precautions should be taken to prevent silane dimerization and oligomerization through siloxane bonds. Any method for this known to those skilled in the art can be used such as careful pH control or capping of the hydroxyl groups to retard siloxane reactions. The amount of the silane compound used in the preparation of the addition polymeric material is an effective amount to give a quantity of the pendent hydrolyzed or hydrolyzable silane moieties in the range of around 1 to about 15 weight percent of the polymeric material. Preferably the amount of the silane is less than around 5 weight percent of the polymeric material and most preferably around less than 2 weight percent. With increasing percentages of the pendant silane the film formed from the polymeric material has increasing brittleness. In using the vinyl silanes the activity ratio is lower than that of the acryloxysilanes so that the order of addition of the silane to the ionic monomer is performed to disfavor the formation of homopolymer from the ionic monomer.

In addition to the two aforelisted monomers used in preparing the addition polymeric material, one or more additional monomers can be used that are any ethylenically unsaturated monomer having at least one

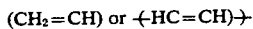
$(CH_2=CH)$ or $+HC=CH)+$ group which is preferably devoid of monomers having active hydrogens like those in hydroxyl, carboxyl or unsubstituted amide groups. Any of the aforementioned ethylenically unsaturated monomers useful in preparing the ionic monomers can be used. It is preferred to use the same ethylenically unsaturated monomer as the additional monomer and also as the base monomer for the ionic monomer. When the additional monomer is present, it is present in an amount in the range of less than about 70 weight percent of the resulting polymeric material. A preferred additional monomer is methacrylic acid. Its preferred amount in the polymeric material is an amount that does not terminate the pendant ionic character of the polymeric material below that needed for water emulsifiability and most preferably water solubility. With the use of one additional monomer the polymeric material that is produced is a terpolymer.

The addition polymeric material, which can be referred to as an interpolymer or interaction polymer, is prepared, for example, by solution polymerization of the ionic monomer and the silane monomer in the presence of a free radical initiator. The solvent is preferably water but an organic cosolvent having a boiling point not substantially in excess of about 100° to 110° C. can be used. A few suitable examples include ethylacetate, toluene, benzene, methyl ethyl ketone or the like. Preferably the organic cosolvent is one that is soluble in water such as acetone. The solution may also include isopropanol which can act as a solvent and a stabilizing agent to thwart undesired gelation. Also, the solution polymerization is carried out to retard dimerization or oligomerization of the hydrolyzable or hydrolyzed silanes to siloxane material. An example of such a procedure is to conduct the reaction in a nonoxidizing atmosphere such as with a nitrogen blanket or purge. After the ionic monomer and silane monomer are combined in the solvent and/or cosolvent/solvent combination, the solution is stirred and swept with nitrogen and the temperature of the solution is raised to around 80° C. A catalytic amount of a free radical initiator is added, and the nitrogen flow is continued. Suitable free radical initiators are water miscible or soluble like alkali metal persulfates. The exothermic polymerization reaction proceeds with vigorous refluxing and the temperature can rise to about 80° to 90° C. With subsidence of the exothermic polymerization, stirring and heating to maintain the temperature at around 80° C. continues for several hours to assure substantially complete polymerization. Other polymerization procedures such as emulsion polymerization and other free radical polymerization techniques known to those skilled in the art can be used.

After formation of the addition interpolymer other materials can be added to the formulation. An example of these include: a cure accelerating catalyst such as an organic acid; for example, toluene sulfonic acid, N-butyl phosphoric acid and the like or a metallic salt of an organic acid; for example, tin naphthenate, tin benzoate, tin octoate, and the like. When an accelerating catalyst is used, it is present in an amount of around 0.1 to about 5 weight percent of the total formulation.

In preparing the addition interaction polymer, intimate contacting of the monomers occurs at a pH less than or equal to around 4 or greater than or equal to around 9. The temperature of the reaction is preferably an elevated temperature of 100° C. or less and most preferably a temperature of around greater than ambient to around 90° C. at ambient pressure. Subatmospheric or superatmospheric pressures can also be used with adequate compensation of the temperature for the reaction. Constant agitation accompanies intimate mixing of the monomers, and the contacting is performed in any manner but preferably the silane monomer is added dropwise to the ionic monomer present in the solvent or solvent-cosolvent mixture.

The addition interpolymer produced has both pendant ionic moieties and pendant hydrolyzable or hydrolyzed or partially hydrolyzed silane moieties. The interpolymer can be a copolymer either block or random depending on appropriate control of the copolymer reaction, when the ionic monomer and silane monomer are the reactants, or a terpolymer when these reactants are used with the additional monomer. Any conditions known to those skilled in the art can be used to control the copolymer reaction to produce random, block or graft copolymers. When only the ionic monomer and silane monomer are used to form the addition interpolymer, the interpolymer has the formula:

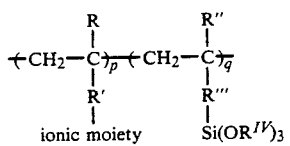

where:
R is hydrogen or an alkyl group, and
R' is an organic moiety that in addition with the

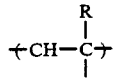

moiety and ionic moiety comprised the ethylenically unsaturated monomer having an ionic moiety before addition polymerization;

R'' is hydrogen or an alkyl group having one to 5 carbon atoms;

R''' is a $(C(O))-O-(CH_2)_x)$ or a $(CH_2)_x$ moiety, where x is an integer from 1 to 6; and $R^{IV}$ is hydrogen and/or an alkyl group having 1 to about 4 carbon atoms, p and q are integers with values of around 80 to around 90 for p and around 1 to around 20 for q, x is an ionic group of sulfonate, quaternary ammonium salt or carboxylate.

When additional monomers are used, their repeating units can be made to occur randomly throughout the polymer or in blocked fashion in the polymer. The general molecular weight range of the addition interaction polymer can range from around that for a dimer to that which is not too high to result in a viscosity resulting in gelation or in an inability for application of the interpolymer to a surface. Preferably, the minimum molecular weight is that which is effective to result in formation of a self-supporting film of the polymer when it is applied to a surface and volatiles are removed.

The formulation of the addition interpolymer with its carrier can be applied to substrates to form a film or coating by any method known to those skilled in the art to myriad types of substrates. For instance, useful application techniques include: brushing, dipping, spraying and flow or roll coating and like techniques. The coating can interact with the substrate by covalent bonding, ionic bonding, hydrogen bonding, and/or Van der Waal bonding through the siliconate anion for the basic solution or the silanol groups of the interaction polymer. Hydrolyzation is accomplished by increasing the pH of the aqueous solution prior to or during application to the substrate. Nonexclusive examples of such substrates include: leather, wood, paper of fabric stock, clay coated print sheet stock, plastics, inorganic oxides such as glass, aluminum, and steel, and any other inorganic or organic solid material which possess either oxygen, chemisorbed or covalently bonded, or hydroxyl (boned or free) at the substrate's initial or exposed surface and includes any materials which can be treated by coupling agents known in the prior art. The inorganic oxide material can be in any form including particles of regular or irregular shape such as spherical, individual fibers such as glass fibers, woven fiber mats or fabric ceramic fibers or continuous surfaces such as sheets, films, slabs and formed shapes. Specific illustrations of suitably employed inorganic oxide materials are, for example, brass (with an oxidized surface), aluminum metal (oxidized at its surface), iron or steel (oxidized at its surface), alumina, aluminum trihydrate, siliceous materials such as fume silica, hydrated silica (precipitated silica), silica aerogels, silica xerogels, aluminum silicates, calcium, magnesium silicates, asbestos, glass fibers, silica fibers, clays, molecular sieves, wollastonite, calcium carbonate, carbon black (including lamp black) titanium dioxide (including titanium dioxide which contains hydrochloric soluble alumina and/or silica, calcium sulfate, magnesium sulfate, calcium carbonate containing a silica coating or agglomerated to silica and the like.

The addition interpolymer of the present invention, which is a polymeric adhesion promoter, can be used in essentially the same manner as coupling agents known in the prior art. It is believed without limiting the invention that the functional mechanism of the interpolymer application with inorganic oxide surfaces is similar to the prior art monomeric coupling agents. The interpolymer can be supplied to the surface of the inorganic oxide or organic material prior to contacting with any additional polymeric materials to be reinforced or augmented with the inorganic oxide or organic material. Also, the coating composition can be applied as a primer coating to the surface of inorganic oxides in the form of the aqueous emulsion.

Once the interaction polymer is applied, usually in an aqueous mixture, curing occurs through drying at ambient or elevated temperatures. The drying reduces the moisture content, removes volatiles and possibly induces some crosslinking. Lower elevated temperature curing is satisfactory for the interaction compositions of this present invention. The use of ambient temperature curing requires a cure period of up to two days to achieve a coating with fully developed properties. It should be noted, though, when cured at ambient temperatures, the coating is dry to the touch after only a few hours. A more fully developed cure in the coating can be achieved by applying heat, with a temperature of less than about 150° C. being sufficient.

It is believed, but the invention is not limited by this belief, that in the cure by drying of the aqueous solution on a substrate improved adhesiveness of the coating to a substrate is achieved by the silanol bonding to the hydroxyl-containing surface alone or along with a minor degree of siloxane crosslinking of the silylated polyhydroxylated polymer.

One particularly useful inorganic oxide surface for the interpolymer is glass fibers; suitable examples of glass fibers include: "E-Glass" or "621-" glass fibers and low or free boron or fluorine derivatives thereof. The interpolymer in an aqueous treating composition is applied to the fibers, preferably in the fiber forming operation.

In the preferred embodiment of the present invention the ionic monomer depends somewhat on the desired ionic character, i.e. whether cationic or anionic moieties are desired for the addition interpolymer. When the anionic character is desired, the preferred ionic monomer is the styrene sodium sulfate, and when the cationic character is desired, the preferred ionic monomer is the quaternary ammonium monomer which is preferably the Sipomer cationic methacrylate monomer. One of these monomers is diluted with distilled water and intimately contacted with gamma-methacryloxypropyl-trimethoxy- silane in an effective amount to produce around less than 5 weight percent pendant reactable silane on the addition interpolymer and most preferably less than around 2 weight percent. An additional ethylenically unsaturated monomer may be used if maximum ionic character in the addition interpolymer is not desired and a reduction in cost is a concern. The intimate contacting of the monomers is performed in the presence of a free radical initiator preferably potassium persulfate in an amount less than around 1 weight percent in the presence of distilled water as a carrier or solvent. The reaction is conducted in a suitable vessel for stirring of the materials and for conducting the reaction as a solution polymerization in a nonoxidizing atmosphere effected by nitrogen purging. The reaction is heated to a temperature of around 70° to 85° C. for a time around 1.5 to 3 hours. The resultant aqueous solution of the addition interpolymer is useful directly for coating inorganic surfaces and especially for coating glass and most particularly glass fibers. With the use of the SSS ionic monomer some of the interpolymer formed can have mer groupings having the formula:

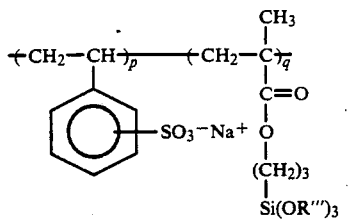

where p and q are integers as previously described. With the use of the cationic methacrylate monomer the interpolymer formed has a majority of mer groupings having the formula:

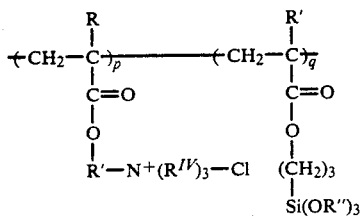

wherein:

R is an alkyl group like $CH_3$ or one with more carbon atoms,

R' is an alkyl group with 1 to around 6 carbon atoms; and

R" is hydrogen and/or an alkyl with 1 to 4 carbon atoms.

Molecular weights of the sodium styrene sulfonate-containing interpolymer, that is a copolymer, can be around 29,000 number average molecular weight and around 350,000 weight average molecular weight. For the quaternary ammonium salt-containing interpolymer the number average molecular weight can be around 60,000, and the weight average can be around 155,000.

ILLUSTRATIVE EXAMPLES

A

Sodium styrene sulfonate (SSS) in an amount of 150 grams was dissolved with water to a one kilogram total in a two liter flask. An amount of 0.37 grams potassium persulfate ($K_2S_2O_8$) was added, and the components were heated to 72 degrees C. for one hour and fifteen minutes with stirring. The heating was stopped and the heat source removed. A clear pale yellow dried film was produced which was brittle and flaky and water soluble. The film didn't adhere to a glass slide.

B

Two grams of SSS were dissolved in 20 milliliters of distilled water and 0.02 of a gram of potassium persulfate was added. The solution was heated to 60 degrees Celsius for one hour. The product was a viscous solution that gave a brittle and flaky film. To this latter solution partially hydrolyzed gamma-methacryloxy-propyltrimethoxy silane or 3-(trimethoxysilyl)-propyl methacrylate (A-174 silane) in water was added, and the solution was reheated. A film of this solution on a glass slide gave no improvement in adhesion to glass. To the solution with the SSS and A-174 silane some potassium persulfate was added, and the solution was heated to 60 degrees Celsius. A film of this latter solution on a glass slide did not give any improvement in adhesion to glass.

C

Sixteen grams of a quaternized product of dimethylaminoethyl methacrylate and methyl chloride were added to twelve grams of water. An amount of 0.12 of a gram of potassium persulfate ($K_2S_2O_4$) was added, and the components heated at 70 to 80 degrees C. for three hours under a nitrogen atmosphere. A dried film of the resultant product was colorless and did not soften upon standing, and did not adhere to a glass slide and was water soluble.

EXAMPLES

EXAMPLE 1

An amount of 475 grams of sodium styrene sulfonate (SSS) as a free flowing white powder was dissolved in 2000 grams of distilled water. An amount of 25 grams of (A-174) was added to the solution. Potassium persulfate ($K_2S_2O_8$) in an amount of one gram was added to the solution in the glass reaction vessel. The solution was heated to 80 degrees Celsius with nitrogen bubbled through the solution. After two hours a yellow gelatinous material was evident in the vessel. This material was not stirable, but when it was diluted to five (5) percent solids the gel reverted to a solution. The solution was further diluted to 1.25% solids and applied to glass fibers during their formation. The fibers had a fiber diameter of "K"(around 13 micrometers), and four hundred of the fibers were formed into a strand of K-37 construction. The strand was wound on a winder into a annular multilayered package. The strand was tested for the amount of organic coating on the fibers by a loss on ignition (LOI) test. The result was an average LOI of 0.44 weight percent.

EXAMPLE 2

An amount of 147 grams of SSS was charged to a two liter round bottom glass flask, and distilled water was added to 900 grams. Stirring was begun and hydrolyzed A-174 silane in acetone was added. This silane solution was prepared with three grams A-174 silane and acetone to 100 grams. To the silane and SSS solution, an amount of 0.37 grams of potassium persulfate was added. The solution was heated for 3.45 hours at 63 degrees C. for around 2.25 hours and at 71 degrees for one hour and at 85 degrees for 0.5 hour. A glass slide was dipped into the resulting solution, and a dried film of the solution on the slide adhered to the glass and was insoluble in water.

EXAMPLE 3

To a three liter glass flask equipped with a stirrer, nitrogen bubbler and thermometer, there was combined 412 grams of SSS, which has a molecular weight of 206 grams, and 1460 grams of distilled water and 0.41 grams of $Na_2S_2O_8$. The nitrogen purge was begun, and heat to a maximum temperature of 50 degrees C. was applied to solubilize the SSS. Upon and increase in viscosity a hydrolyzed solution of A-174 silane was quickly added. The silane solution was prepared by combining 9.96 grams of A-174 silane with 200 grams of distilled water and adding acetic acid in sufficient quantities to achieve a pH of 5. Also added was a solution of potassium persulfate that was prepared by combining 0.54 grams with 20 grams of distilled water. This mixture was heated to 70 degrees C. for 1.5 hours. An amount of 10 milliliters of isopropyl alcohol was added and heating was continued for another 30 minutes. After this time the temperature was dropped to 65 degrees and the solution was poured into a plastic bottle.

EXAMPLE 4

An amount of 30.4 grams of Sipomer Q-6-75 cationic methacrylate monomer as a 75% active water solution was combined with 1.5 grams of A-174 silane and with 0.12 of a gram of $K_2S_2O_8$ and 120 grams of distilled water. The mixture was heated at a temperature in the range of 70 to 80 degrees for three hours. A film of the resultant solution was produced which softened upon standing, which indicated hydroscopicity.

EXAMPLE 5

The neat 75% active Sipomer monomer was added to distilled water and combined with 5% A-174 silane and the combination with stirring was heated at a temperature in the range of 80 to 90 degrees C. Eventually a clear solution was obtained. A film of the solution was formed on a glass slide, and the film was water insoluble. This same reaction was conducted in the presence of potassium persulfate, and no difference in viscosity or other differences were noticed.

EXAMPLE 6

An amount of 100 grams of the Sipomer monomer was combined with two grams of the A-174 silane and 0.1 gram of potassium persulfate and 900 grams of distilled water. The combination was heated and stirred under nitrogen purge at 80 degrees C. for four hours. An orange slimy viscous solution was obtained. A film of the solution formed on a glass slide was dried, and the resultant film was brittle, but it did not wash off the slide with water.

EXAMPLE 7

An amount of 692 grams of Sipomer monomer (75 percent active) having molecular weight of 207.6 was diluted with distilled water in an amount of 1708 grams and an amount of $Na_2S_2O_8$ of 0.52 grams. This was achieved in a 3 liter flask. Subsequently, nitrogen purging was commenced and hydrolyzed A-174 silane was charged to the flask. The hydrolyzed A-174 silane was prepared by 12.4 grams of A-174 mixed with 250 milliliters of acidic acid to achieve a pH in the range of 4 to 5. Heating was started and subsequent thereto, the potassium persulfate in the amount of 0.68 grams dissolved in 25 grams of water was added. The heating was up to 40° C. in 10 minutes and up to 55° C. in an additional 30 minutes and up to 70° C. in additional 19 minutes and up to 85° C. in an additional 41 minutes and down to 80° C. in an additional 30 minutes to give a total heating time of 2 hours and 20 minutes. After this time the variac was turned off and 10 grams of isopropyl alcohol was added and the flask was removed from the mantle and the solution poured into a plastic bottle.

EXAMPLE 8

An amount of 150 grams of 2-acrylamido-2-methyl-propane sulfonic acid (AMPS monomer) having a molecular weight of 229 in a 50 percent aqueous solution was combined with hydrolyzed A-174 silane and 200 milliliters of water. The hydrolyzed silane was prepared from 1.62 grams of the material having a molecular weight of 249 added to water (50 ml) which was acidified with acidic acid to a pH of 5.0. The mixture in the reaction vessel was stirred until homogeneous. With the addition of the AMPS monomer and water, the solution was purged with nitrogen for 0.5 to one hour and warmed to 40° C. An amount of 0.15 grams of potassium persulfate having a molecular weight of 270 was added along with sodium metabisulfite (0.6 grams). The mixture was warmed to a temperature in the range of 55° to 60° C. for 2 to 2.5 hours. After this time a glass slide was dipped in the solution to produce a film on the slide and the film cured to a colorless film on heating the slide on a hot plate.

EXAMPLE 9

To a 500 ml three-necked, round-bottom glass vessel equipped with a thermometer, condenser, nitrogen dispersion tube and addition funnel there was added 27.8 grams of a sodium hydroxide as a 50 percent aqueous solution along with 100 ml of water. Methacrylate in an amount of 29.8 grams and 50 ml of water was added slowly to the vessel. An amount of 75 grams of AMPS 2405 monomer (50 percent solution) and 100 ml of water were added to the reaction vessel and nitrogen purging was continued for another 0.5 hours. Campden sodium metabisulfite (0.4 grams) and potassium persulfate were dissolved in 4 ml of water and added via syringe at a temperature of 34° C. to the reaction vessel. An amount of 2.53 grams of A-174 silane was hydrolyzed with acidic acid in water and was slowly added dropwise over a period of time when the temperature reached 35°-36° C. The mixture became hazy (white) within 0.5 hours; approximately half of the silane was added.

EXAMPLE 10

The A-174 silane in an amount of 2.53 grams, where the molecular weight is 249, was hydrolyzed in 50 ml of distilled water acidified with acidic acid to a pH of 5. A similar reaction vessel to that of Example 9 was charged with 200 ml of distilled water and 67.6 grams of SSS and 75 grams of AMPS 2405 (50 percent aqueous) and another addition of distilled water in an amount of 100 ml. The hydrolyzed A-174 silane was added and the mixture was warmed to 35° to 40° C. with nitrogen purging for one hour. An amount of potassium persulfate of 0.4 grams was mixed with metabisulfite and added to the mixture of AMPS and polystyrenesulfonate.

From the aforepresented, an improvement is shown in the affiliation of the addition interpolymer to a glass surface versus no affiliation of the polymers of Illustrative Examples A, B and C to a glass surface. Although not all of the addition interpolymers of the examples formed ideal films, generally the affiliation with the glass surface was better than the polymers formed from Illustrative Examples A, B and C.

We claim:

1. A dried residue upon an inorganic oxide surface having an addition polymeric reaction product comprising:
   a. at least one ethylenically unsaturated monomer having an ionic moiety selected from the group consisting of sulfonates and quaternary ammonium salts that makes the monomer water emulsifiable in an effective amount to give an amount of the reacted monomer in the polymer for at least water dispersibility of the polymer,
   b. a copolymerizable organo-functional silane compound having ethylenic unsaturation for copolymerization in the organo-functional group and having associated with the silane three groups selected from alkoxy, hydroxy, and mixtures thereof, where the silane compound is present in an effective amount to give an amount of free-radically reacted or pendant silane in the range of about 1 to about 15 weight percent of the interpolymer, where the addition polymer is formed in the presence of a free-radical initiation catalyst in an effective catalytic amount and of at least one liquid carrier at an elevated temperature in a nonoxidizing atmosphere, wherein the addition polymer has pendant ionic moieties and pendant silane moieties, where the silane moieties have groups selected from the group consisting of hydrolyzable, hydrolyzed and partially hydrolyzed groups.

2. The dried residue upon an inorganic oxide surface of claim 1, wherein the silane compound for the addition polymeric reaction product is present in a water soluble organic solvent.

3. The dried residue upon an inorganic oxide surface of claim 1, wherein the silane compound for the addition polymeric reaction product is selected from the group consisting of acrylatoalkoxysilanes, methacrylatoalkoxysilanes, and vinylalkoxysilanes.

4. The dried residue upon an inorganic oxide surface of claim 1, wherein the silane compound for the addition polymeric reaction product is partially hydrolyzed.

5. The dried residue upon an inorganic oxide surface of claim 1, wherein the silane is in a solution of diluted acetic acid for partial hydrolyzation.

6. The dried residue upon an inorganic oxide surface of claim 1, wherein the addition polymeric reaction product is formed with at least one additional monomer having ethylenic unsaturation present in an amount of less than about 700 weight percent of the polymer.

7. The dried residue upon an inorganic oxide surface of claim 1, wherein the addition polymeric reaction product in the residue has the vinyl monomer selected from the group consisting of: acrylic and methacrylic acid, styrene and methyl styrene.

8. The dried residue upon an inorganic oxide surface of claim 1, wherein the addition polymeric product has the ethylenically unsaturated monomer with an ionic moiety selected from the group consisting of: sodium styrene sulfonate, quaternization product of dimethylaminoethyl methacrylate and of methyl chloride, quaternization product of vinylpyridinium compound and of (dimethylamino)ethyl methacrylate, and 2-acrylamide-2-methylpropanesulfonic acid, and mixtures of any and all of these.

9. The dried residue upon an inorganic oxide surface of claim 1, wherein the addition polymeric product has water as the liquid carrier and the polymerization is solution polymerization.

10. The dried residue upon an inorganic oxide surface of claim 1, wherein in the addition polymeric product the amount of the free-radically reacted and pendant silane is in the range of less than around 5 weight percent of the polymer.

11. The dried residue upon an inorganic oxide surface of claim 1, wherein the inorganic oxide surface is glass fiber.

12. A dried residue upon an inorganic oxide surface, wherein the residue has an addition polymeric reaction product, comprising:
a. at least one ethylenically unsaturated monomer having at least one ionic moiety per monomer and where the ionic moiety is selected from the group consisting of: sulfonates and quaternary ammonium salts and mixtures thereof in an amount to produce the polymerized reaction product in the polymer in an amount of up to 99 weight percent of the polymer; and b. a copolymerizable organofunctional silane compound selected from the group consisting of acrylatoorganoalkoxysilanes, methacrylatoorganoalkoxysilane, and vinylorganoalkoxysilanes where the alkoxy group has alkyl groups with up to five carbon atoms or partial or fully hydrolyzed derivatives in an amount in the range of about 1 to about 15 weight percent of the polymer; and where the addition polymeric product is formed in the presence of a water miscible free-radical initiation catalyst in an effective catalytic amount and in the presence of water in at least an effective dispersing amount and at an elevated temperature in the range of about 80° C. to about 90° C. for a period of time at least to approach complete polymerization, wherein the addition polymer has pendant ionic moieties and pendant silane moieties that have groups selected from the group consisting of hydrolyzable, hydrolyzed and partially hydrolyzed groups.

13. The dried residue upon an inorganic oxide surface of claim 12, wherein the addition polymeric reaction product in the residue has the amount of ethylenically unsaturated monomer having at least one ionic moiety in an amount to achieve an amount of reaction monomer in the polymer in the range of about 85 to about 95 weight percent and the amount of copolymerizable ethylenically unsaturated organosilane is effective to achieve an amount of silane with reactable groups of up to 5 weight percent.

14. The dried residue upon an inorganic oxide surface of claim 12, wherein the addition polymeric reaction product in the residue has at least one additional repeating unit from an ethylenically unsaturated monomer where the amount of the mer is present in the amount of less than around 70 weight percent of the polymer and the amount of ethylenically unsaturated monomer with the ionic moiety effective to achieve an amount of about 10 to about 98 weight percent of the polymer.

15. The dried residue upon an inorganic oxide surface of claim 12, wherein the inorganic oxide surface is glass fiber.

16. A dried residue upon an inorganic oxide surface, wherein the residue has an addition polymeric product having the formula:

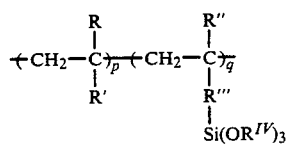

wherein:
R is hydrogen or an alkyl group,
R' is selected from an organic moiety that in addition to the

moiety and ionic moiety comprise the ethylenically unsaturated monomer having an ionic moiety before addition polymerization, R″ is hydrogen or an alkyl group having one to 5 carbon atoms, R‴ is a $(C(O)-O-(CH_2)_x)$ moiety or $(CH_2)_x$ moiety where x is an integer from 1 to 6; and $R^{IV}$ is hydrogen, an alkyl group having 1 to about 4 carbon atoms or a mixture thereof, and p and q are integers with values of around 80 to around 90 for p and of around 1 to around 20 for q.

17. The dried residue upon an inorganic oxide surface of claim 16, wherein the addition polymeric reaction product in the residue has at least one addition repeating unit from an ethylenically unsaturated monomer where the amount of the mer is present in the amount of less than around 70 weight percent of the polymer and the amount of ethylenically unsaturated monomer with the ionic moiety effectively to achieve an amount of about 10 to about 98 weight percent of the polymer.

18. The dried residue upon an inorganic oxide surface of claim 16, wherein the inorganic oxide surface is glass fiber.

19. A dried residue upon an inorganic oxide surface, wherein the residue has an addition polymerization product having the formula:

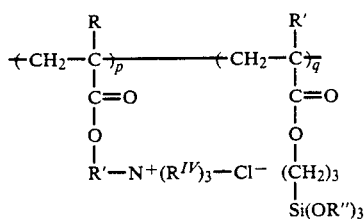

wherein:

R is an alkyl group like $CH_3$ or an alkyl group with more carbon atoms,

R′ is an alkyl group with 1 to around 6 carbon atoms; and

R″ is hydrogen and/or an alkyl with 1 to 4 carbon atoms and p and q are integers with values of around 80 to around 90 for p and around 1 to around 20 for q.

20. The dried residue upon an inorganic oxide surface of claim 19, wherein the addition polymeric reaction product in the residue has at least one additional repeating unit from an ethylenically unsaturated monomer where the amount of the mer is present in the amount of less than around 70 weight percent of the polymer and the amount of ethylenically unsaturated monomer with the ionic moiety effectively to achieve an amount of about 10 to about 98 weight percent of the polymer.

21. The dried residue upon an inorganic oxide surface of claim 19, wherein the inorganic oxide surface is glass fiber.

22. A dried residue upon an inorganic oxide surface, wherein the residue has an addition polymerization product having the formula:

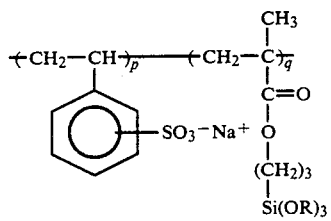

wherein R is hydrogen or alkyl group having one to four carbon groups or a mixture thereof, and p and q are integers where p has a value in the range of around 80 to around 99 and where q has a value in the range of 1 to around 20.

23. The dried residue upon an inorganic oxide surface of claim 22, wherein the addition polymeric reaction product in the residue has at least one additional repeating unit from an ethylenically unsaturated monomer where the amount of the mer is present in the amount of less than around 70 weight percent of the polymer and the amount of ethylenically unsaturated monomer with the ionic moiety effectively to achieve an amount of about 10 to about 98 weight percent of the polymer.

24. The dried residue upon an inorganic oxide surface of claim 22, wherein the inorganic oxide surface is glass fiber.

* * * * *

UNITED STATES PATENT AND TRADEMARK OFFICE
CERTIFICATE OF CORRECTION

PATENT NO. : 5,032,455
DATED : July 16, 1991
INVENTOR(S) : David E. Dana, et al

It is certified that error appears in the above-indentified patent and that said Letters Patent is hereby corrected as shown below:

On the title page, item [54] and Column 1, line 1, in the title:

the word "SILYATED" to read as --SILYLATED--.

Abstract, line 7, delete the word "group" and insert --groups--.

Column 13, claim 5, line 28, delete "claim 1" and insert --claim 2--.

Column 13, claim 7, line 36, delete "claim 1" and insert --claim 4--.

Column 15, claim 12, line 15, delete "addition" and insert --additional--.

Signed and Sealed this

Sixteenth Day of September, 1997

Attest:

BRUCE LEHMAN

Attesting Officer

Commissioner of Patents and Trademarks